(12) United States Patent
Crow et al.

(10) Patent No.: US 7,334,038 B1
(45) Date of Patent: Feb. 19, 2008

(54) BROADBAND SERVICE CONTROL NETWORK

(75) Inventors: James J. Crow, Austin, TX (US); Dennis L. Parker, Leander, TX (US)

(73) Assignee: Motive, Inc., Austin, TX (US)

( * ) Notice: Subject to any disclaimer, the term of this patent is extended or adjusted under 35 U.S.C. 154(b) by 0 days.

(21) Appl. No.: 09/542,602

(22) Filed: Apr. 4, 2000

(51) Int. Cl.
G06F 15/16 (2006.01)

(52) U.S. Cl. .................. 709/227; 709/228; 709/229; 370/352

(58) Field of Classification Search ................ 709/220, 709/231, 312, 227, 228; 787/1; 370/352
See application file for complete search history.

(56) References Cited

U.S. PATENT DOCUMENTS

| | | | |
|---|---|---|---|
| 5,852,722 A | 12/1998 | Hamilton | 395/200.51 |
| 5,901,352 A | 5/1999 | St-Pierre et al. | 455/426 |
| 5,933,646 A | 8/1999 | Hendrickson et al. | 395/712 |
| 5,951,694 A | 9/1999 | Choquier et al. | 714/15 |
| 5,995,999 A | 11/1999 | Bharadhwaj | 709/200 |
| 6,067,568 A | 5/2000 | Li et al. | 709/223 |
| 6,085,120 A | 7/2000 | Schwerdtfeger et al. | 700/90 |
| 6,128,293 A | 10/2000 | Pfeffer | 370/359 |
| 6,173,326 B1 | 1/2001 | Collins | 709/229 |
| 6,188,888 B1 | 2/2001 | Bartle et al. | 455/417 |
| 6,199,104 B1 | 3/2001 | Delph | 709/208 |
| 6,209,125 B1 | 3/2001 | Hamilton et al. | 717/4 |
| 6,215,855 B1 | 4/2001 | Schneider | 379/22 |
| 6,237,135 B1 | 5/2001 | Timbol | 717/1 |
| 6,249,578 B1 | 6/2001 | Gilles et al. | 379/221 |
| 6,256,772 B1 | 7/2001 | Apte et al. | 717/1 |
| 6,279,125 B1 | 8/2001 | Klein | 714/38 |
| 6,285,983 B1 | 9/2001 | Jenkins | 705/10 |
| 6,289,381 B1 | 9/2001 | Brodigan | 709/225 |
| 6,298,353 B1 | 10/2001 | Apte | 707/103 |

(Continued)

FOREIGN PATENT DOCUMENTS

JP 02001117932 A 4/2001

(Continued)

OTHER PUBLICATIONS

Welcome to AOL.com, http://web.archive.org/web/19981201225748/http://www.aol.com/, © 1998 America Online, Inc., 2 pages (printed Dec. 1, 2003).

(Continued)

Primary Examiner—Jason Cardone
Assistant Examiner—Adnan M. Mirza
(74) Attorney, Agent, or Firm—Campbell Stephenson Ascolese LLP

(57) ABSTRACT

Services are provided in an architecture utilizing a framework of standardized interconnection mechanisms that allow for the dynamic addition of new services that meet rules for the distributed services network. Likewise, new agents may readily be added to the network. The network architecture is composed of agent software at the broadband subscriber endpoint in conversation with server software at the service provider location. Under the present architecture, certain minimum service functionality is provided to any subscriber by way of a registration service for new subscribers, a login service for existing subscribers, subscriber profile services, connection services and plug-in management services. Through this network, a subscriber can access these services as well as additional services that are dynamically added to the network.

17 Claims, 10 Drawing Sheets

U.S. PATENT DOCUMENTS

| | | | |
|---|---|---|---|
| 6,324,619 B1 | 11/2001 | Raverdy et al. | 711/11 |
| 6,330,006 B1 | 12/2001 | Goodisman | 345/762 |
| 6,335,927 B1 * | 1/2002 | Elliott et al. | 370/352 |
| 6,381,742 B2 | 4/2002 | Forbes et al. | 717/11 |
| 6,438,744 B2 | 8/2002 | Toutonghi et al. | 717/137 |
| 6,459,773 B1 | 10/2002 | Posthuma | 379/1.04 |
| 6,463,078 B1 * | 10/2002 | Engstrom et al. | 370/466 |
| 6,463,079 B2 | 10/2002 | Sundaresan et al. | 370/468 |
| 6,463,578 B1 | 10/2002 | Johnson | 717/124 |
| 6,470,074 B2 | 10/2002 | Teixeria | 379/32.04 |
| 6,473,791 B1 | 10/2002 | Al-Ghosein et al. | 709/217 |
| 6,477,580 B1 * | 11/2002 | Bowman-Amuah | 709/231 |
| 6,490,722 B1 | 12/2002 | Barton et al. | 717/174 |
| 6,529,511 B1 | 3/2003 | Du et al. | 370/397 |
| 6,560,213 B1 | 5/2003 | Izadpanah et al. | 370/338 |
| 6,560,704 B2 | 5/2003 | Dieterman et al. | 713/100 |
| 6,564,377 B1 | 5/2003 | Jayasimha et al. | 717/174 |
| 6,636,329 B2 | 10/2003 | Koppich et al. | 358/1.15 |
| 6,636,505 B1 | 10/2003 | Wang et al. | 370/352 |
| 6,640,239 B1 | 10/2003 | Gidwani | 709/203 |
| 6,684,242 B1 | 1/2004 | Bahlmann | 709/222 |
| 6,694,350 B2 | 2/2004 | Kurashima et al. | 709/203 |
| 6,704,927 B1 | 3/2004 | Bak et al. | 717/151 |
| 2001/0020249 A1 * | 9/2001 | Shim | 709/220 |
| 2002/0095400 A1 * | 7/2002 | Johnson et al. | 707/1 |

FOREIGN PATENT DOCUMENTS

| | | | |
|---|---|---|---|
| WO | WO9903036 | 1/1999 | 9/46 |

OTHER PUBLICATIONS

American Online Software Version 5.0 Screenshots, 8 pages.

* cited by examiner

BROADBAND SERVICE CONTROL NETWORK

INCORPORATION BY REFERENCE

The following applications are hereby incorporated herein by reference in their entirety and made part of the present application:
(1) U.S. patent application Ser. No. 09/542,274, filed concurrently herewith; and
(2) U.S. patent application Ser. No. 09/542,273, filed concurrently herewith.

BACKGROUND

1. Technical Field

The present invention relates to the field of computer systems. In one aspect, the present invention relates to the dynamic management of services in a distributed computer network environment.

2. Description of Related Art

In conventional computer network applications, particularly telecommunication networks (e.g., high-speed or broadband access to the Internet), it is common for an application running at a particular computer to interact with or use another application that may be located at the same computer or at a different computer connected to the network. It is also common for services to be provided to subscribers using client-server relationships between the subscriber and provider. In addition, technology in the computer area is subject to rapid change, both in the hardware and software technologies that are continually introduced. As a consequence, computer applications in a network environment are often faced with changes in the network environment, whether they be changes on the subscriber side, changes in software applications used by a program or changes in hardware (including changing the machines or connections used to run services in the network environment). The challenge of adapting to new technologies resides not only with the end user, client or agent side, but also with the network service provider. For example, an Internet Service Provider ("ISP") experiences changes in the hardware and software technologies that must be supported, in the expectations of the subscribers, and in the need for service enhancements to respond to competitive pressures. Where the number of resource users (e.g., clients or agents) is unpredictable, it can adversely affect the performance of the resource (e.g., servers). In addition, where the locations of agents, servers and/or services to change over time, it becomes relatively difficult for agents to access services after relocation of such services within a conventional client/server based computer system. The addition of new services also presents challenges of notifying agents of their availability. Likewise, the large volume and unpredictable nature of the agent activity within a network can compound such problems. Conventional client/server based computer systems are unable to track the dynamic location and relocation of services both externally and within the computer system. Managing distributed state is a particular challenge to this imperative, since the services need to be able to rely on certain facts about the agent state, but also need to avoid the overhead of storing per-agent state at the service end.

Further limitations and disadvantages of conventional systems will become apparent to one of skill in the art after reviewing the remainder of the present application with reference to the drawings and detailed description which follow.

SUMMARY OF THE INVENTION

In accordance with the invention, a communication network is provided including a plurality of server devices for providing dynamic management of services in a distributed computer network environment. Services are provided on server devices connected to a network, and there is also at least one agent process residing on a agent device connected to the network. As an example, a registration service located at a server registers new subscribers to the distributed services network and assigns agent-identifications to each registered subscriber. For example, the registration service may collect profile data from a subscriber and forward the profile data to other services, such as the subscriber profile database management service described herein. There may also be provided a login service on a server to connect existing subscribers to the distributed services network. There may additionally be provided a connection service at a server for monitoring the status of each connected subscriber. For example, the connection service may include an agent connection status service residing on a status server to periodically probe each subscriber that is connected to the distributed services network. A plug-in management service may also be provided at a server to maintain copies of plug-in modules used in the distributed services network and to distribute a copy of a plug-in module requested by a subscriber. For example, the plug-in management service can update a subscriber connected to the distributed services network with a current plug-in for a specified service. If desired, a subscriber profile database management service resides at a server to store subscriber profile data. For example, the subscriber profile management service may comprise a subscriber profile database, a profile create service that creates entries in the subscriber profile database, a profile update service that updates entries in the subscriber profile database and a profile query service that searches for entries in the subscriber profile database. As part of a system for managing services in a distributed services network, a message posting service may be provided at a server machine on the network to transmit messages to all subscribers connected to the distributed services network. A service point map management service may also be provided at any of the server machines in the network for collecting location information for each service connected to the distributed services network and generating a service point map listing of selected services for distribution to subscribers. The service point map management service may use any of a variety of load balancing techniques to generate the service point map listing.

In accordance with an alternate embodiment of the present invention, a client/server communication network is provided for operating an agent machine having a service location map. In an exemplary method of operation, an address for a login service in the network of distributed services is retrieved from the service location map, the login service is contacted, a request for access is sent to the network of distributed services by transmitting an agent-identification to the login service, an updated service location map is received from the login service, profile data corresponding to the agent-identification is received, the profile data is compared to profile information stored at the agent machine to determine if a agent update action is required by the agent machine, and connection is established to a selected service listed in the updated service location map using location information contained in the updated service location map for the selected service. In addition, the method of operating an agent machine in the network may also include retrieving an address for a registration service in the network of distributed services from the service location map, contacting the registration service to request access to the network of distributed services, receiving an agent-identification from the registration service, receiving a current service location map from the registration service, and connecting to a selected service listed in the current service point map using location information contained in the current service location map for the selected service. If desired, an address for a plug-in management service in the network of distributed services is retrieved from the service location map, the plug-in management service is contacted with a request for delivery of a selected plug-in, the selected plug-in is received from the plug-in management service and installed at the agent machine. In one example of the method, an address for a requested service in the network of distributed services is retrieved from the service location map, the requested service is contacted at a first server, and a determination is made if the agent machine requires an agent plug-in update to access the requested service. Any required agent plug-in update can be received from any of server in the network (such as the plug-in management service) and then installed so that the selected service can be run.

In accordance with a still further embodiment of the present invention, a method is provided for managing multiple services on multiple servers as an extensible service bus. In once example, the method includes providing a registration service where an agent machine can register as a subscriber with the extensible service bus and receive a subscriber identification. A login service may also be provided where subscribers can connect to the extensible service bus and receive a subscriber identification. A service map management service may also be provided that receives server location information from each of the plurality of services and generates a service location map listing of services included on the extensible service bus and server location information corresponding to each service. A copy of such a listing may be transmitted to each subscriber to the extensible service bus. In one example, the server location information is selected based on server load balancing techniques. In addition, a connection status service is provided to monitor the connection status of subscribers and servers connected to the extensible service bus. In addition, a subscriber profile database service may be provided that stores subscriber data that is required for access to the extensible service bus. A message posting service may also be provided for sending messages directly to a subscriber connected to the extensible service bus.

DETAILED DESCRIPTION OF DRAWINGS

Figure 1:
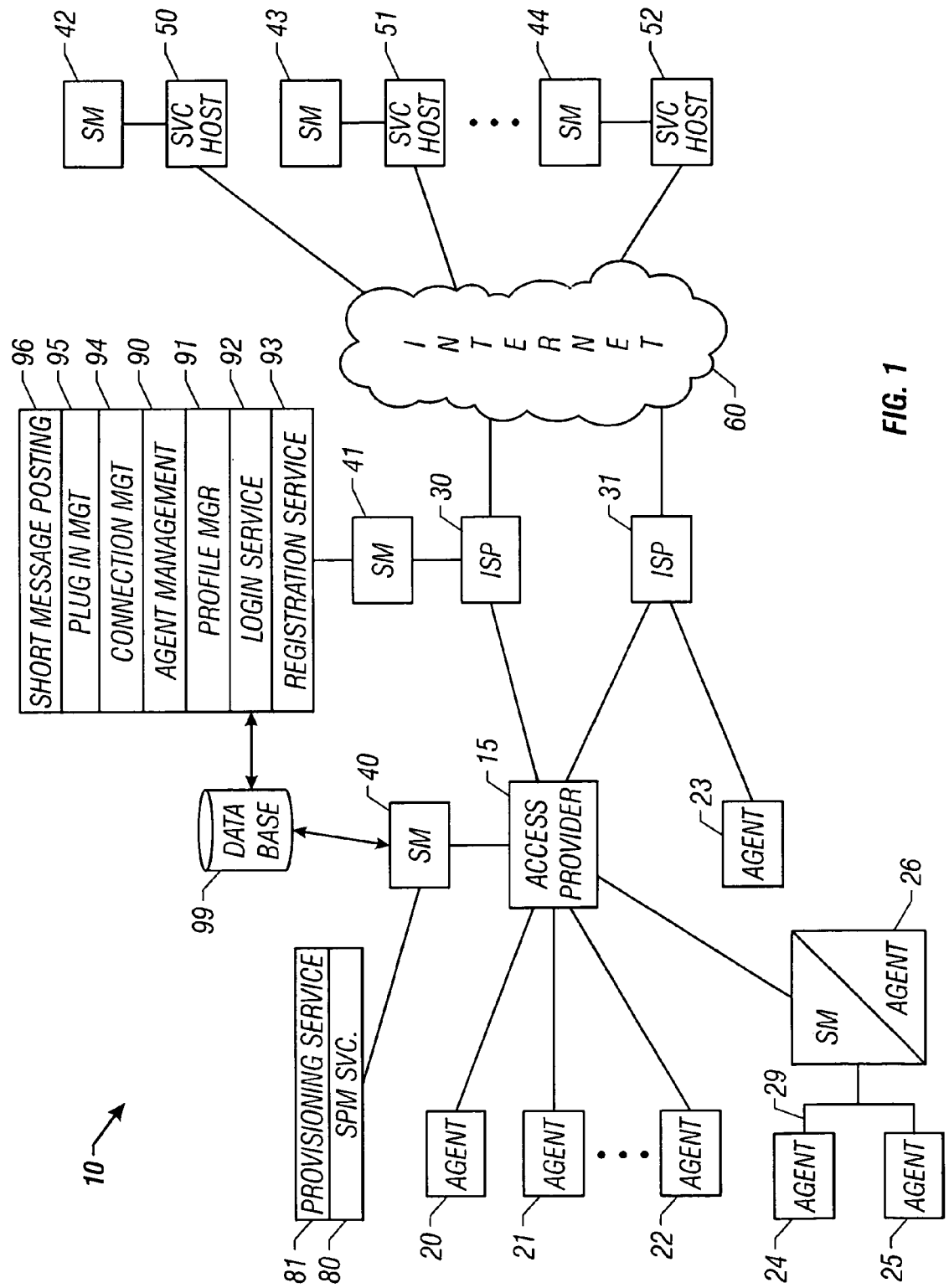
FIG. 1 is an exemplary embodiment of a network of distributed and extensible services in an agent and service mediator based computer system according to the present invention.

FIG. 1 shows an exemplary distributed network environment 10 in which extensible services are dynamically provided to the subscriber/agents (e.g., 20, 21, 22, 23, 24 and 25) through a network consisting of the broadband access provider 15, the internet service provider 30, 31, the internet 60, and service offering hosts 50, 51 and 52. As used herein, "agent" is an example of the type of service subscriber used in connection with the present invention, where there are numerous other potential subscriber types, such as client machines, desktop or laptop computers, "thin" terminals, etc. Service mediator machines 40, 41, 42, 43, 44 and 26 are present in the network and establish communications dialogs with agents and other Service mediators for service control within this network. The location of individual machines within the Service Network is established using a dynamically updated service address information element distributed across a framework of standardized interconnection mechanisms (such as described in the co-pending applications referenced above). In such a network, the process of connecting an agent 20 to the services it wants to use must satisfy diverse requirements for performance, flexibility, scalability and manageability. From the perspective of the service host 50 or ISP 30, the flexibility and scalability requirements must be considered foremost, especially on the server side of operations where the number of agent requests per task, and the complexity of the tasks themselves, should be simplified. The present invention allows for the dynamic addition of new services that meet the rules for the distributed services network (the bus interface rules), whether the service resides at a server machine (e.g., 50), agent machine (e.g., 20), ISP (e.g., 30), within the access network 15 or elsewhere. Likewise, new agents may readily be added to the network. Shown in FIG. 1 is an exemplary embodiment of a distributed services network wherein a certain minimum service functionality is provided to any subscriber, such as agent 20, by way of a registration service 93 for new agents, a login service 92 for existing agents, subscriber profile database services 91, agent connection services 94 and agent management services 90. Through this network, a subscriber (at agent machine 20, for example) can access these services as well as additional services (e.g., new services added to Service Mediator 41 or 42) as they are added to the network. It will be appreciated that the allocations of services in the present invention need not follow the distribution across servers illustrated in FIG. 1, but can be regrouped, consolidated or arranged in alternate configurations without departing from the scope of the present invention.

As shown in FIG. 1, the typical user of the distributed services network is an Internet Service Provider ("ISP") 30 using broadband subscriber connections, although the technology is broadly applicable for use on other sites, including remote servers (e.g., 50, 51, 52) or agent machines (e.g., 23). Regardless of where the services reside, it is helpful to think of each of these operating environments as a self-contained functional unit, or a "sphere." For example, there is the ISP Sphere 30, which includes all the hardware at the ISP's site, and the various Subscriber Spheres (e.g., 20, 21, 22), which include the hardware at the subscriber sites. Additional spheres may be connected such as the broadband access provider Sphere (e.g., 15) which includes all networking hardware and service machines needed to provide broadband carriage of data.

Though not shown explicitly in FIG. 1, each subscriber sphere which uses the distributed services network includes a service point map (SPM) functionality that tracks the location and status of services within the distributed services network 10. In an exemplary embodiment, the SPM is the basic unit of communication used to notify agent machines (e.g., 20, 21, 22, 23, 24, 25) of the location of individual service mediator machines (e.g., 40, 41, 42, 43, 44, 26) within the network 10. The SPM mechanism is also used by individual service mediator machines (e.g., 40) to establish the location of other service mediation machines (e.g., 44, 43) within the network 10. The concept of SPM is dynamic and may be tiered to allow extension of basic functionality.

Most of the subscribers (e.g., 20, 21, 22) are likely to be individuals, but many will be connecting internal LANs 29 to the distributed services network 10 via the connection through the gateway or server 26. In the latter case, it may be desirable to host some portion of a service mediator on the subscriber's LAN 29. In this case, the agent machine 26 contains both agent and service mediator functionality. It provides service mediator functionality to the agent machines 24, 25 that are locally connected.

Some of the services that the ISP 30 wants to offer to the subscriber (e.g., 20) may involve direct connections between services that are not part of the distributed services network. These may be traditional services such as SMTP and POP email transport or may be extension to services controlled by the distributed services network 10.

Figure 2:
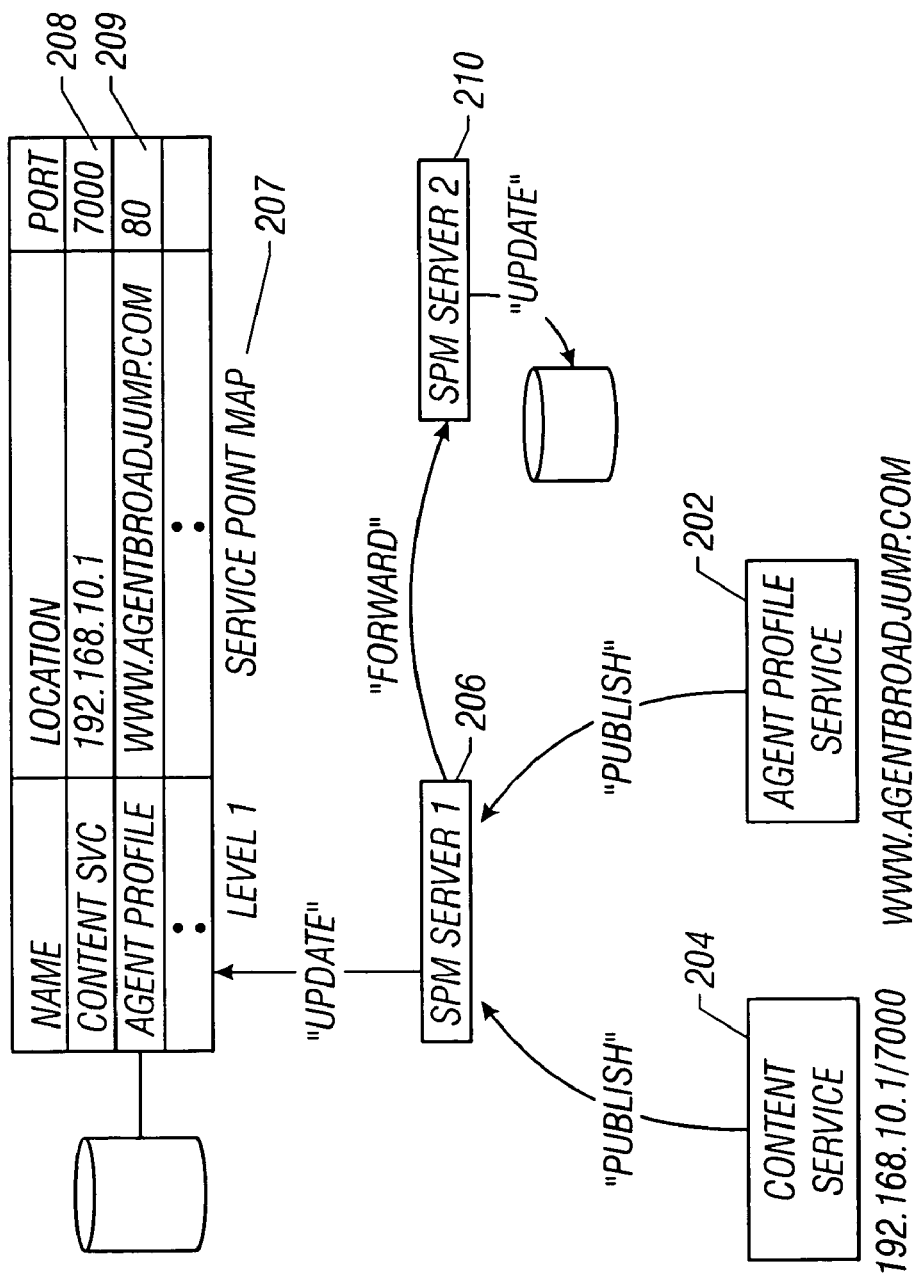
FIG. 2 illustrates a service advertising aspect used in one embodiment of the invention.

FIG. 2 illustrates a service advertising aspect of an exemplary embodiment of the present invention. As shown in FIG. 2, when a service (e.g., 204) "joins" the distributed services network, it "advertises" itself by "publishing" a listing at a special service on the network. This listing defines what service it provides and where it can be contacted. The form of the service addressing information used throughout the distributed services network is called a service point map (SPM) 207. Each process in any connected sphere 202, 204 that implements a service has an entry 209, 208 in an SPM 207. The base services have entries in the "Level 1" or "Top Level" SPM. In an exemplary embodiment, the SPM 207 is hosted and maintained by a designated service mediator 206 (e.g., FIG. 1, 40) which is the entry point into the distributed services network for most "join" operations, all base service "joins" and any non-first-time agent "joins."

While several methods of pre-defining the service location exist, two methods are shown in the example of FIG. 2. The content service is identified by a specific IP address and port value pair. The agent profile service is located using a standard URL format and relies of DNS resolution by those seeking service. FIG. 2 also shows the distribution of the SPM across multiple SPM service machines. Upon an update of the SPM by service machine 206, the updated map is forwarded to additional SPM service machines 210 for immediate use.

As shown in FIG. 1, multiple Service Mediator machines may be present, each with their own SPM service 206 for identifying the locations of the various services to the distributed services network. This allows the Service Mediators (e.g., 202) as well as the service machines (e.g., 204) to be partitioned by resource connection as discussed below.

Referring again to FIG. 2, a service (e.g., a content service) begins operations when the server 204 becomes aware that it is supposed to start a server application that implements that service. The server 204 uses the appropriate operating system dependent functions to start registration service. The service constructs an SPM entry for itself during this initialization. The SPM entry contains the service name, version number, and network connection information for the specific instance, or server 204. The SPM entry is submitted to the SPM management service 206 and stored as an entry 208 in the SPM 207, at which time the content service is said to be "active," implying that it is available to service requests.

When a server 204 shuts down, it notifies the SPM service 206 with a list of the SPM entries that it had as "active", and the SPM service 206 removes them from the Level 1 SPM 207. Entries will also be removed in the case that a server becomes unreachable.

In distributed services networks where large numbers of agent instances may be connected at any one time, the present invention allows services to be strategically partitioned or distributed to provide scalability to the overall architecture of the network. As described in the co-pending applications incorporated by reference hereto, service point maps are useful for distributing and allocating the available services to any subscribers to the distributed services network. Although the present invention includes "blind" generation and distribution of SPM's to agents (i.e., all SPM entries received from the services are included in the SPM that is distributed to the subscriber machines), the present invention also encompasses intelligent generation of SPM's whereby only selected available services are included on an SPM at any given time. The present invention also allows for intelligent use of the SPM to actively choose or process the selected SPM entry based on service qualification information. For example, available services may be dimensionally partitioned so as to separate the operational tasks into as many discrete and independent code paths as is practically possible. Several such partitioning methods exist, which allow services to be implemented separately on separate servers, allow multiple servers to be implemented on a single server, or allow more than one server to provide a service. Through the use of tiered service location through dynamic SPM generation and dynamic selection from within a specific SPM, services may be partitioned by specific resource requirements, services may be pooled into equivalent peers for load balancing and services may be selected based upon some real-time element of the data or transaction being processed.

Figure 3:
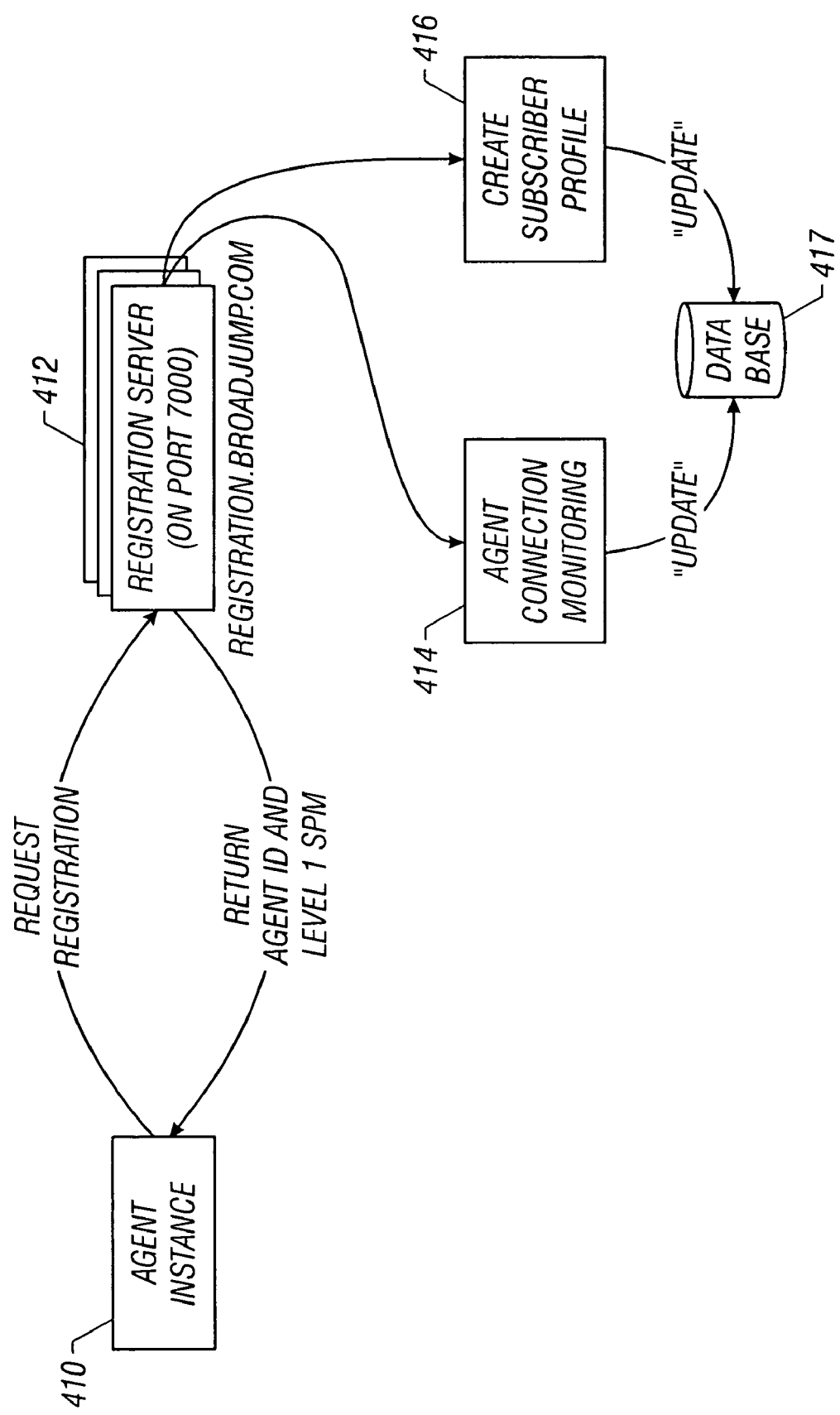
FIG. 3 shows a subscriber registration aspect used in an exemplary embodiment of the present invention.

FIG. 3 shows an agent registration aspect used in an exemplary embodiment of the present invention. According to the registration aspect, when a subscriber runs the distributed services agent for the first time, the agent instance establishes its place in the distributed services network by contacting a centralized registration service. This mechanism allows for the agent software to be distributed in a generic form across the entire services network. When the generic agent registers, it may be customized by the service mediator machines as needed. The service mediator may qualify the agent by some means such as network location or user name, and automatically deliver the specific appearance or functionality to that agent instance.

In accordance with the selected embodiments shown in FIG. 3, when an agent 410 is connected to the distributed services network for the first time, the agent instance 410 establishes its place in the network by contacting the registration service server 412. The registration service generates an agent-ID for the new agent instance. The agent-ID value is unique in time and space, so that multiple registration servers can implement the registration service without the need for shared state, thus enabling partitioning by equivalency. The registration service at server 412 then collects a current Level 1 SPM (see SPM 207 in FIG. 2) from the service point map service server (see FIG. 1, SPM service 80) and supplies this to the agent 410. This enables the agent 410 to contact the services identified on the SPM 207, effectively completing the connection process. The SPM selected for the new agent instance is dynamic and may be determined by arbitrary analysis of the agent. This further allows for generic agent software to be distributed across the network and be specifically directed to certain service mediators at the time of registration.

As also shown in FIG. 3, the registration service creates a new entry in the subscriber profile database 417 (see also database 99 in FIG. 1) using the profile creation service 416. The profile created for the agent instance 410 is based upon the agent-ID so the agent will be recognized on subsequent logins. This profile is maintained and extended over the lifetime of the agent such that it reflects the current state and status of that agent and all services to which the agent has subscribed. In addition, any subscriber data that is required for access to the distributed services network may be collected. This "subscriber profile" data is largely customer defined, but it is limited to highly static data such as the subscriber's name and address, the level of service the customer has purchased, and runtime control properties. An example of the last type would be the name and type of the subscriber's mail servers.

The manner of collection of this profile data is flexible in that it can be either pre-registered or collected at installation time. When the pre-registration method is used, a data entry application is used to create the agent's profile and fill it with the information that is available at the time. When the installation takes place, the install process asks the installer for some key data, such as a work order number, or the subscriber's name and address. This key data is used to find the partially completed entry, which is then updated with items such as the agent-ID. Other possible install time data might be subscriber system configuration information.

As shown in FIG. 1, the registration service 93 may optionally use a provisioning data service 81 for retrieving data that was entered about the subscriber prior to the registration of this agent instance. This provisioning service maintains entries that have been prepared during the process of arranging for installation at the subscriber's site such as during the order entry process. The database contains basic network and service related information specific to an individual in the network. This data is searchable on any field, so the installation tool need only be provided with enough detail to uniquely identify the pre-registered subscriber, e.g. a work order number, a name and address, etc. The provisioning data service 81 may also maintain a connection to the subscriber profile query service 91 so that it can support multiple agent program initializations for a single subscriber. The two common reasons for multiple initializations are that the subscriber is using more than one machine, and when the agent program is reinstalled without using a previously assigned agent-ID.

Once the registration of the agent instance 410 is complete, the registration service 412 also sends an "update" message to the agent connection monitoring service 414 (see also FIG. 1, Connection Management 94) to notify the service that the agent-ID is "active." The database 417 (see also FIG. 1, 99) is updated to reflect the current connectivity status of each individual agent in the network.

Figure 4:
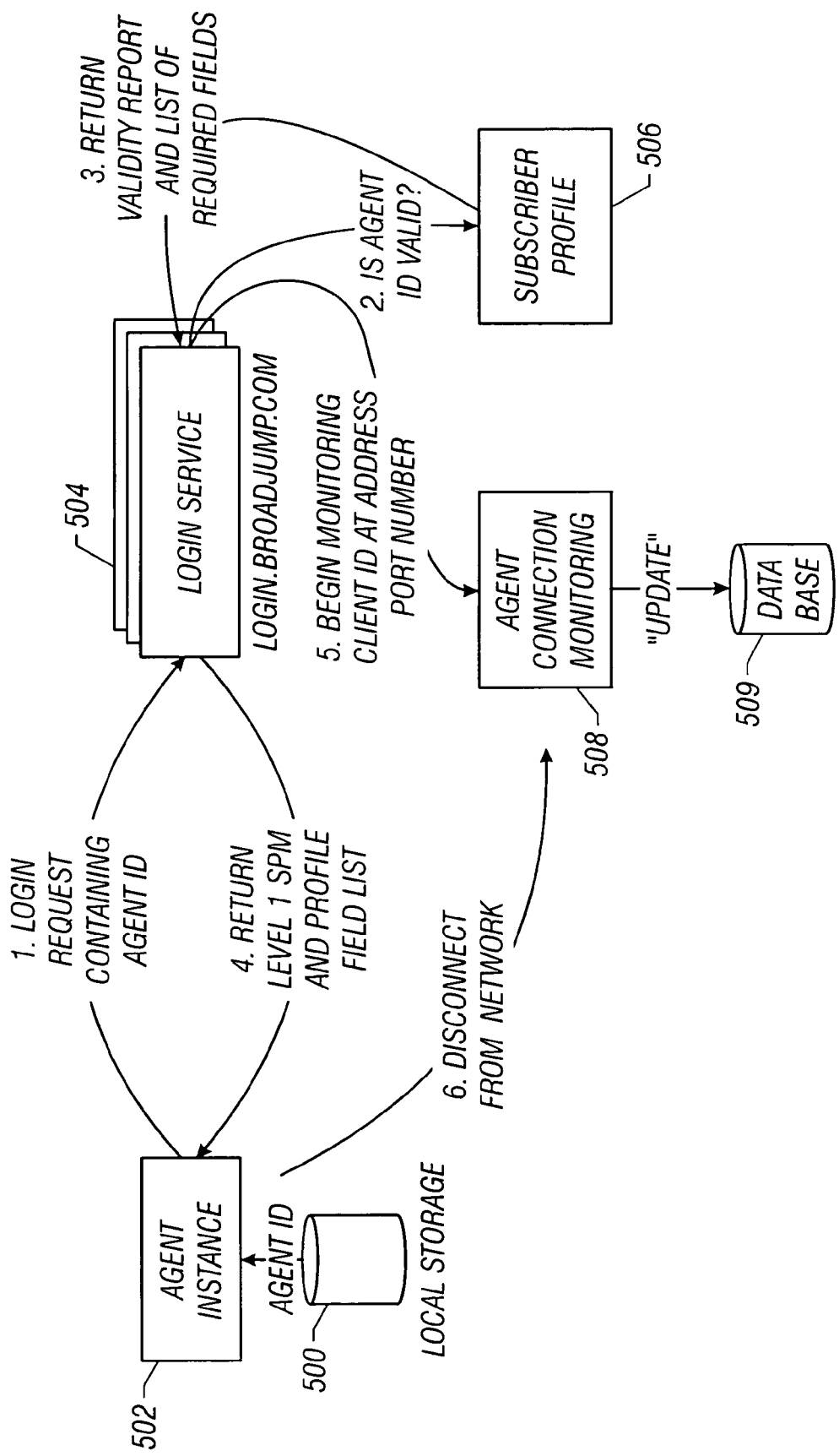
FIG. 4 shows a subscriber login aspect used in an exemplary embodiment of the present invention.

FIG. 4 shows a subscriber login aspect used in an exemplary embodiment of the present invention. According to the login aspect, when a registered agent connects to the distributed services network, its agent-ID is checked for validity. Once verified, the agent then receives an updated copy of the location information for the services currently running on the distributed services network and may also receive a copy of its profile data. In one embodiment, the profile data that has been stored locally is compared to the data received during login, and any differences are used to trigger update actions at one or both of agent and Service Mediator machines.

In accordance with the selected embodiments shown in FIG. 4, if an agent 502 had previously registered with the network and received an agent-ID from the registration service, the agent 502 makes all subsequent connections to the network by contacting the login service server 504 and providing the agent-ID. The login service 504 verifies that the agent-ID is valid, and then replies to the agent 502 with a copy of the current Level 1 service point map. The agent 502 is then able to connect to other services identified on the SPM.

If the login service 504 is using a resource connection based partitioning scheme, then the SPM returned will include only services in the partition connected to the login service 504 that the agent contacts. Alternatively, all connections to the distributed services network can be made through a single server (such as an SPM manager server) which has stored thereon the current level 1 SPM.

Upon successful login, the login service 504 may send an update message to the agent connection monitoring service 508 to notify that service that the agent-ID is "active." The agent profile database 509 (see also FIG. 1 Database 99) is then updated with the current connection status for that agent instance.

As shown in FIG. 4, the reply from the login service 504 may also include a list of the current required fields in the subscriber profile database. This allows the agent instance 502 to determine whether it needs to collect additional data from the subscriber or the agent host machine.

When an agent instance 502 completes a normal shut-down process, it sends a "disconnect" notification to the agent connection monitoring service 508 which, as described herein, tracks the connection state of agent instances within the network. The agent profile database 509 (see also FIG. 1 Database 99) is then updated with the current connection status for that agent instance.

In a selected embodiment, the distributed services network uses "subscriber profile" information that is associated with an agent instance running on a machine in an agent sphere. There may be more than one subscriber profile entry per actual subscriber, and a unique agent-ID is used as the "primary" key for all operations on the subscriber profile data. The subscriber profile data is preferably relatively static in nature. For example, the profile data contains information about which version of the various agent plug-in applications are currently loaded into the agent instance as well as the current configuration of each agent instance. FIG. 1 shows a selected embodiment of the profile database management service 91, the database itself 99, and the typical update operations that would arise from services 81, 94, 90, 92, 93.

In the embodiments described so far, central management of this data 99 is important where each connection of a agent process to the distributed services network will create at least one query on this data, and possibly one or more "update" operations. Both the login 92 and registration 93 services must be prepared to meet extraordinary peak demands, so each service needs high-speed, scalable access to the database 99.

Figure 5:
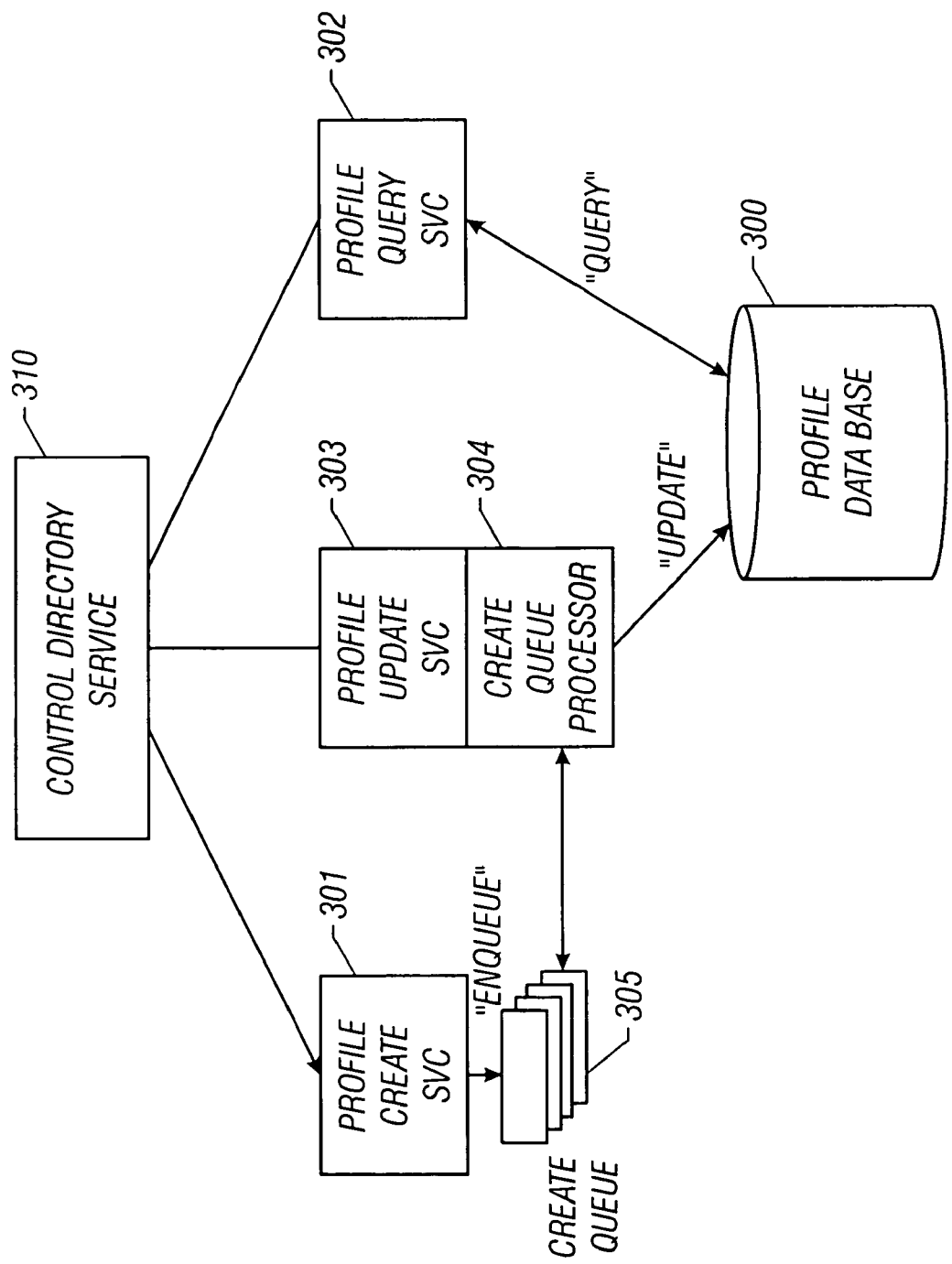
FIG. 5 illustrates the management and interfaces of the agent profile database used in an exemplary embodiment of the present invention.

FIG. 5 shows a selected example where a profile database service with high-speed query and high-speed "create" and "update" operations are defined to be somewhat mutually exclusive. The subscriber profile database 300 (see also database 99, FIG. 1) is implemented as a set of three services partitioned functionally. They are the Subscriber Profile Create (SPC) service 301, the Subscriber Profile Update (SPU) service 303, and the Subscriber Profile Query (SPQ) service 302.

With reference to the selected embodiment shown in FIG. 5, the SPC service 301 uses an intermediate, persistent data set that is implemented as a queue 305, which is externally accessible to reader processes and is normally accessed in "first-in, first-out" order. The SPC service 301 does not return a reply to the "create" request until it has created a new queue entry and completed the en-queue operation. This ensures that, at the completion of the registration request, the agent-ID is in persistent storage but may not yet be present in the central database 300. Under these conditions, abnormal process termination or machine failure will not cause loss of the agent-ID.

The SPC service 301 can be partitioned into multiple servers using equivalency partitioning when the primary key for subscriber profile data is the agent-ID, which is guaranteed to be unique. The registration service (FIG. 1, 93) is the only client of the SPC 301 and it will never submit records with duplicate keys.

With reference to the selected embodiment shown in FIG. 5, the subscriber profile update (SPU) service 303 has two roles in managing the subscriber profile database 300. The first is to accept requests to modify existing entries in the database 300, and the second is to act as the queue reader for the queue(s) created by the SPC service 301.

In response to an "update" request, the SPU 303 searches the database 300 for an entry that matches the agent-ID provided in the request, and then modifies the entry accordingly. The changes may be stored to disk so as to make the service recoverable in the event of failure. As will be appreciated, the SPU service 303 may be partitioned into multiple instances using data dependent routing, since the entries are always referenced by a primary key, such as the agent-ID.

As a queue reader, the SPU service 304 accesses each of the queues written by the SPC service 301 and de-queues pending entries. These entries are then placed in the database 300. Of course, if data dependent routing partitioning is active, then each SPU queue reader server 304 will collect only entries which match its own data range rules.

The actual order of "de-queue" and "update" is reversed compared to the conceptual description above. The data is read from the queue, placed in the database using a "create or update" operation, and then de-queued. This removes the need to complete both steps in a single transaction context, which would be a distributed transaction if the SPC service 301 and SPU service 303 were not local to a single process within a single machine. Using this technique, failure recovery is automatic as long as the queue has not been corrupted.

Another function the SPU service 304 may provide in the queue reader role is to search for a specific entry in the queues upon request. If the entry is found, it is transferred to the database 300 and de-queued, and the reply to the request returns the entry.

With reference to the selected embodiment shown in FIG. 5, the Subscriber Profile Query (SPQ) service 302 supports two database lookup functions, one that reports or "verifies" whether a given agent-ID is in the database, and another that returns the contents of the entry for a given agent-ID. This separation is used to enable the fast response time to the login service (FIG. 1, 92), which needs only the verification function.

If an agent-ID is not found in the database 300, the SPQ service 302 contacts the SPU queue reader service 304 to find out if the entry is in the creation queues. If the entry does not exist in either of these locations, the SPQ 302 could check the time value embedded in the agent-ID and use this to choose an action. If the agent-ID was issued recently, then the SPQ service 302 signals an "administrative alert" indicating that a probable service problem exists somewhere in the path, and returns a related error condition to the requester. If the agent-ID issue time was not recent, the SPQ service 302 signals an "administrative alert" indicating that either a database corruption or an unauthorized access attempt is suspected, and a related error condition is returned to the requester. In either event, the invalid agent-ID is stored in a special table that is used to detect denial of service attacks.

In view of the challenges from managing persistent data in large-scale systems, the present invention also accommodates changes in the methods for storing data that may change as scale changes. For instance, commercial relational database management systems ("RDBMS") can provide very high rates of access at reasonable cost at certain scales and for certain tasks. Using such a system for moderate load update processing of subscriber profile data (the SPU service 303) is a good application. The load imposed by the management of dynamic data such as networking statistics when scaled to hundreds of thousands of users is a poor application. In such a case, the rate of update would require a distributed architecture with many instances of the RDBMS, so the expense would likely outweigh the benefits of retaining the data.

Where it is possible to predict some correlation between a service and its agents due to some third element that constitutes a shared resource, the resource connection may be used as a basis for partitioning. Referring for example to the agent connection status service discussed further below and illustrated in FIG. 10, resource connection base partitioning is used to partition the agent connection status service into servers 714, 718, each of which is responsible for part of the topology and for the processes running on machines which share that part of the topology. This partitioning is implemented in one embodiment by sending SPMs to subscribers in that part of topology that include identification and location information for the agent connection status server in that part of the topology that provides the agent connection status service. This has benefits in limiting the load of the probes to the relevant part of the topology, and in increasing the total load capacity of the distributed services network.

Another example where resource connection partitioning is useful occurs where the agent interaction with a group of servers follows a pattern where the agent executes a series of service requests in a defined order before it reaches the result it needs. Finding a service through some sort of lookup operation is a typical example. It is often possible to partition the service that is first in that order as the resource connection, and to get the benefits of resource connection based partitioning in the subsequent calls. In other words, if each "lookup" server is associated with an independent set of the other services, then one of these service sets will be chosen implicitly when the lookup server is chosen. Again, this partitioning may be implemented under control of the SPM distributed to the subscriber machine(s). Server load balancing may also be obtained using functional partitioning whereby a task is divided into discrete functions, and then the functions are separated into independent services. While it is sometimes difficult to separate functions in data management operations where it is necessary to query and update data within the context of a transaction that maintains ACID (Atomicity, Consistency, Isolation and Durability), it is possible to use the functional partitioning technique for data management if there is a "create" operation that is distinct from "update" operations. For example, subscriber profile data that is created more or less constantly but updated only rarely can be jointly managed by two services, one that provides a high-speed create function and one that provides the necessarily slower update function. The update service 303 must be able to allow for the fact that the data is changing while the update takes place. This is possible mainly through careful database design whereby the "update" operation 303 is allowed to modify any-but-the-last record, while the "create" operation 301 always adds as the last record. All records eventually become updatable, but the "create" process 301 is never blocked waiting for the "update" process 303.

It is also possible to accomplish some functional partitioning in data management operations by separating out "query only" operations that can tolerate some delay in presenting the results of updates. For example, some classes of updates to a database can be queued for execution as a low priority task in order to devote maximum resources to delivering high-speed query access. In this model, the queued data must be recoverable in order to tolerate service outages during the delay between en-queuing and actual update. There may also be a need to retry a failed lookup query operation in a way that includes recently updated data.

In some cases, a service may be of a type such that any server will do for any agent request. An example of this is the registration service that provides agent-IDs for newly registered agents. The service creates an ID that is guaranteed to be unique across both time and space. This server can be replicated as broadly as necessary. Another example is where multiple login servers share a single SPM and its copy.

Where functional partitioning is problematic—such as an application that allows users to purchase an item from a limited pool of such items, such as a physical inventory or a "first fifty to subscribe" pool or in some database operations such as updating a user profile another option is to provide the service in multiple server instances by making each server responsible for only a limited subset of the data, and then to direct the agent to the appropriate server based on some key data in the request.

Such partitioning by data dependent routing may be used in a data update operation where the data items are all tied to the primary key "agent-ID" that uniquely identifies subscribers. As a simple example of how data dependent routing works, consider a subscriber profile update service implemented by two server processes to update profile information about service subscribers. Server "A" is responsible for entries that contain an agent-ID that ends in a number evenly divisible by two, and server "B" is responsible for the other half of all entries. When an agent attempts to update an entry, it first checks the agent-ID field of the data it is reading or writing and performs the arithmetic required in order to determine which server is responsible. It then sends the request to that server under control of the SPM.

Figure 10:
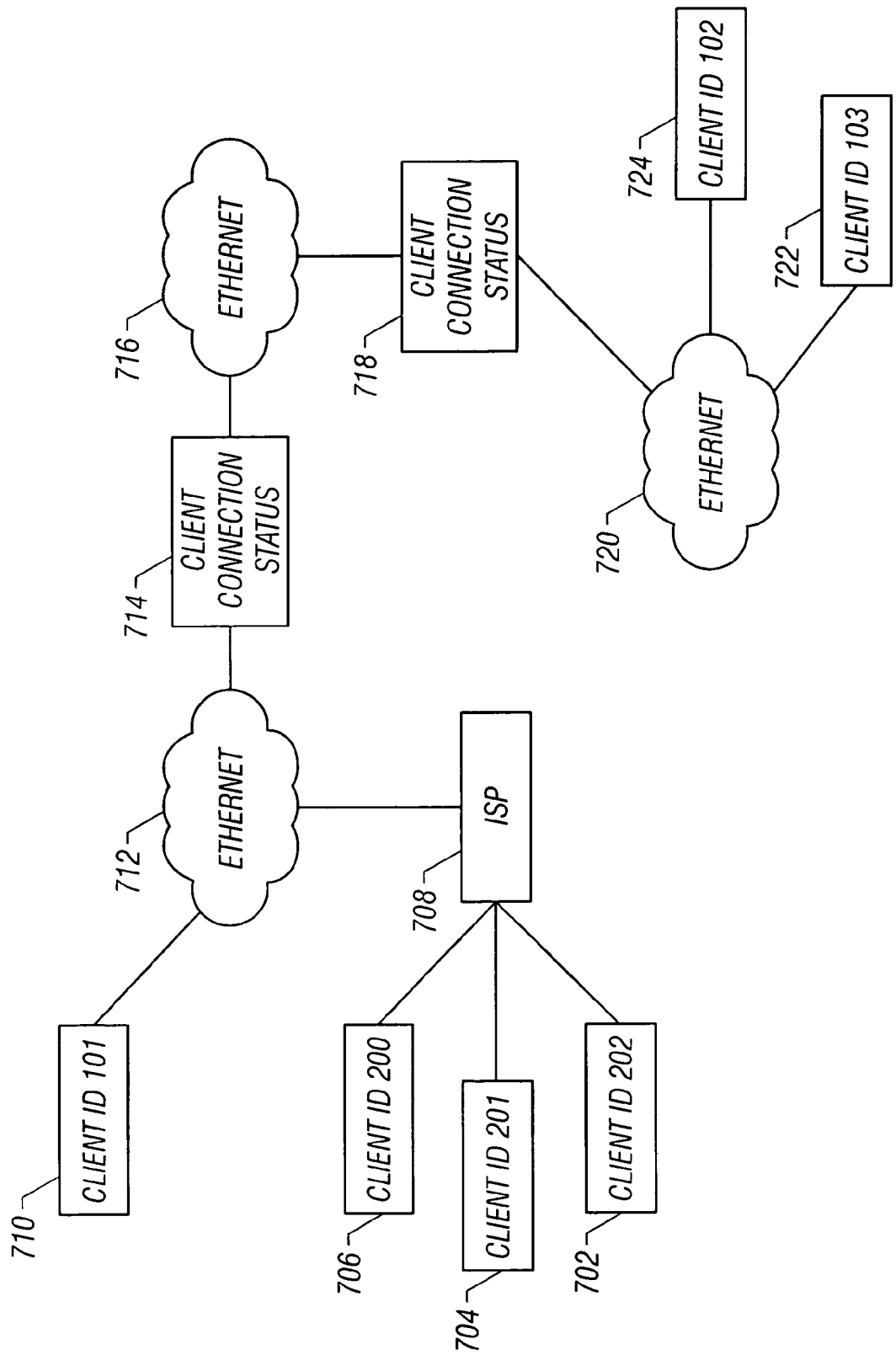

In another aspect of the distributed services network, a connection service is provided as the central access point for the most current connection information for an agent. This service removes the requirement that individual servers keep track of the connection status of each client or subscriber. While it may be implemented with multiple servers, FIG. 10 shows an agent connection monitoring aspect of an alternate exemplary embodiment of the present invention.

As referenced in FIGS. 1 and 4, when the login service 504 accepts an agent login request, the login service sends notification to the agent connection monitoring (ACM) service 508. This service monitors the life cycle of an agent connection from that point in time until the agent disconnects by sending a disconnect request to the ACM. In one embodiment, the CCM uses two component services to accomplish this: the agent connection status (ACS) service and the agent connection directory (ACD) service.

The agent connection status service implements a "keep alive" feature by sending a probe signal to each agent periodically. The interval used is a runtime configurable option that can vary by agent-ID. The probe signal can return information that is collected from the agent machine, such as network statistics. This also is a runtime configurable option that applies to all monitored agents. The retrieved data is stored in any of a variety of ways, including storing the latest value, storing a cumulative value according to the data type, or storing an average value.

Callers to the ACS service can use a variety of methods to gather information about the status of an agent, including polling and subscription methods. In the polling method, the caller sends a request for the status of the agent, and receives a "connected" or "not-connected" indication. If the agent is connected, the caller may also receive the current monitored data for that agent. In the subscription method, the caller registers itself as a "subscriber" to connection status for a given agent. When the client disconnects, the caller receives a message containing the monitored data for the agent. All agent connection and disconnection events are logged to a database.

As illustrated in FIG. 10, the ACS may be partitioned into servers that are placed at the outermost extremity of the network topology that is closest to the agent so that ACS server 714 is topologically close to agents 702, 704, 706, 710, and ACS server 718 is close to agents 722, 724. Of course, the ACS service may be located in other spheres, such as the ISP sphere 708. This resource connection based partitioning method ensures that the probe transmissions will each effect the smallest possible part of the network.

The agent connection directory service controls and tracks the association between ACS servers and agent-IDs. The ACD provides an API that allows the nature of a new connection to be examined by logic that understands the network topology and that assigns the monitoring of the client to the appropriate ACS server. This assignment is recorded in forms that allow searching by a number of hierarchical patterns, such as network topology, connection duration, agent-ID, etc.

When a process wants to access or modify the status for an agent, the process contacts the ACD and searches for the association between the agent-ID and an ACS server. It may then contact the ACS server and make the request.

Yet another potential application of the present invention is to transparently re-route the service requests in the event of any downtime at the service provider. Rather than providing message information (i.e., an e-mail) to inform the subscriber of the unavailability of a particular service, the present invention seamlessly re-routes the subscribers to an alternate service source by distributing SPMs with a new location for the particular service. Once the unavailable service location is up and running, the SPM manager is notified and future SPMs include the address information for the original service provider.

Above the profile services in FIG. 5 is an interface service that provides application interface translation for the low-level service operations. The Control Directory Service (CDS) 310 interface provides industry standard directory look-up interfaces to network resident application programs. This allows all service control applications to access Agent profiles and all other stored data through a standard mechanism. Applications and services within the Distributed Services Network have the option of accessing the contents of the Profile Database 300 through direct interaction with the profile management services SPC 301, SPU 303 and SPQ 302 or through a variety of standardized interface protocols as provided by the Control Directory Service 310. An exemplary use of the CDS would be to allow natural integration within existing networks and computer systems without requiring customization or alteration of those systems. Example protocols supplied by the CDS would be the Lightweight Directory Protocol (LDAP) or Remote Authentication Dial-In User System (RADIUS). Each of these are in common use within existing internet service provider networks. The CDS allows the direct integration of the Profile Database 300 elements into existing business applications and network equipment.

Figure 6:
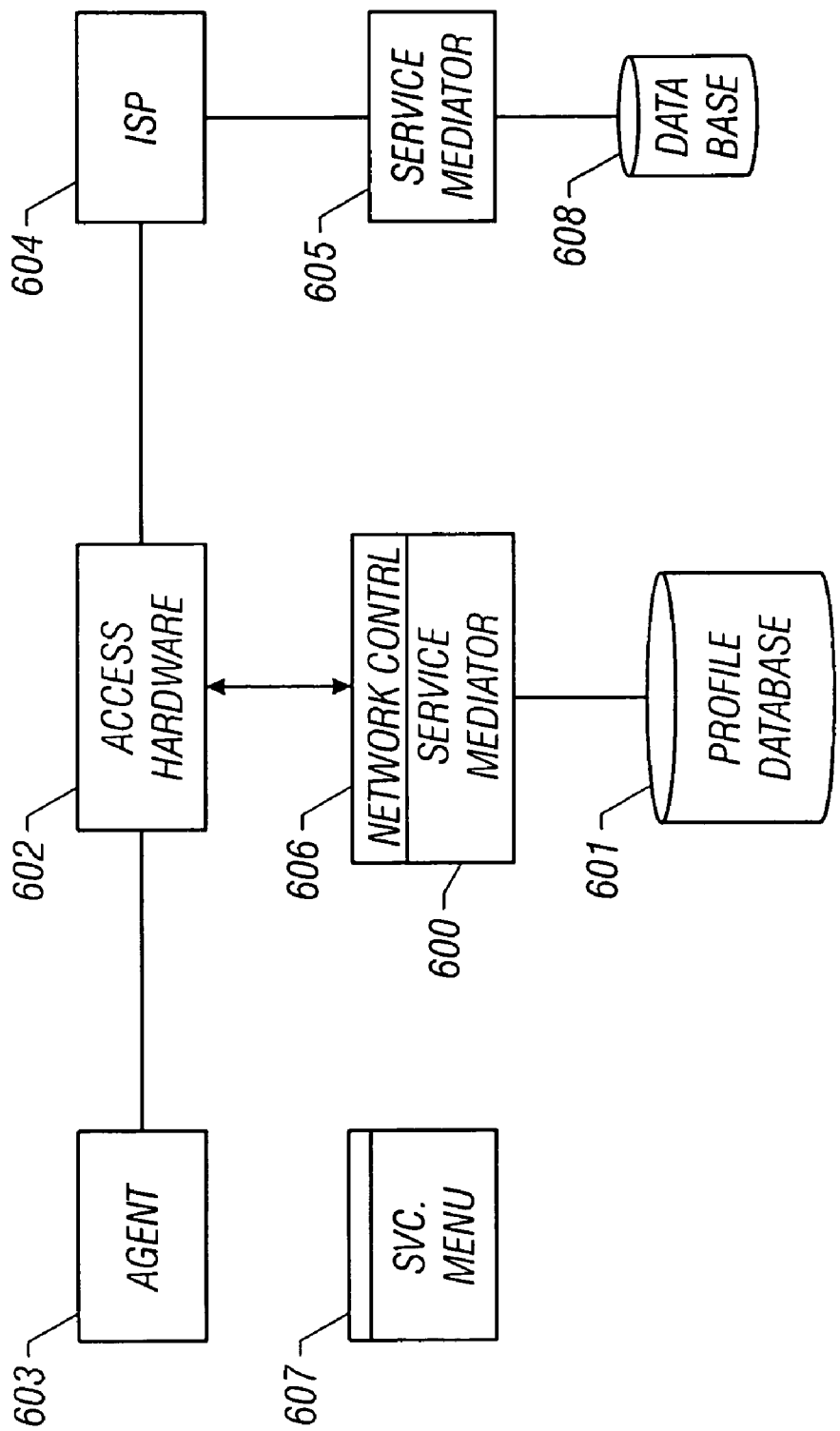
FIG. 6 shows an integration of the service mediator and network control elements used in an exemplary embodiment of the present invention.

To facilitate service offering and control within a broadband access provider network, the intelligence of the agent and Service Mediator system of the present invention could be directly integrated into the operation and control of the networking hardware elements. FIG. 6 illustrates an exemplary embodiment of this integration. The agent 603 is in communications with two Service Mediator machines 600 and 605. The ISP 604 contains Service Mediator 605 which is used to control and track services-oriented data and profiles. The broadband access provider network contains networking hardware 602 such as a Digital Subscriber Line Access Multiplexer (DSLAM) or a Cable Modem Termination System (CMTS). The broadband access provider network also includes Service Mediator 600 for controlling network access settings and profiles. Service Mediator 600 contains an additional network control service 606, which is in direct communication with the network hardware device 602. Although not explicitly shown in FIG. 6, the service details illustrated in FIG. 1 may be present as described in their exemplary form herein.

With reference to the selected embodiment in FIG. 6, the agent 603 would register and login to the service network. The initial service mediator connection would be to the service mediator 600 in the broadband access provider network. This subscriber/agent may have been previously provisioned as described and indicated in FIG. 1, provisioning service 81. The service mediator 600 will process the new agent instance, create the basic service profile in the profile database 601, and present a services menu 607 to the subscriber. The subscriber may then use the service menu 607, within the context of the agent 603 to make service selections such as the desired ISP destination and the desired line speed for access. This selection is processed by service mediator 600 with the subscriber's service profile updated in the database 601. Based on the subscriber service selections, the service mediator 600 instructs the network control service 606 as to the specific hardware device settings needed to make the network physical connection. The network control service 606 communicates these parameters directly to the network hardware device 602, both at the time of service initiation and at each time in the future that the individual subscriber/agent enters the service network. Service mediator 600 also communicates service selection parameters to the ISP service mediator 605 to complete the service provisioning process. Service Mediator 605 creates/updates the service profile for agent 603 in the local profile database 608.

As will be appreciated, the distributed nature of the service mediator deployment allowed through the use of the service point map mechanism provides for a scalable solution for large-scale broadband network deployments. A series of service mediators such as 600 may be located throughout the network in proximity to the hardware elements 602, thereby providing partitioning by equivalence.

Figure 7:
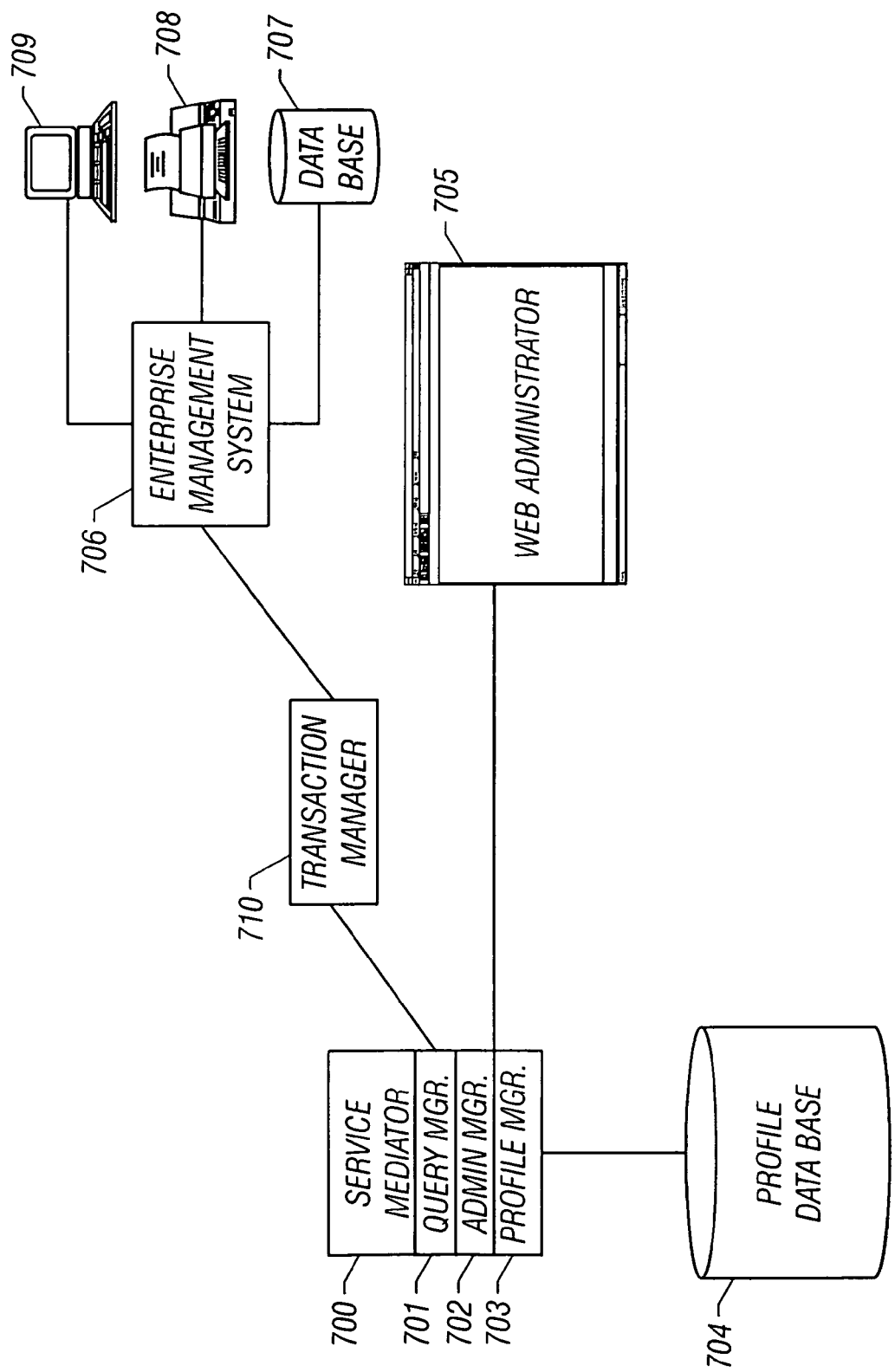
FIG. 7 shows an integration of the service mediator and agent into existing enterprise systems used in an exemplary embodiment of the present invention.

The service mediator system described herein must integrate with and be a natural member of any existing enterprise management systems present in the broadband access provider or ISP environment. FIG. 7 illustrates an exemplary embodiment of the integration of the service mediator 700 and database 704 into administrative and reporting systems. With reference to the selected embodiments in FIGS. 7 and 5, the profile database 704 would be populated and managed by the service mediator 700 and the profile manager service 703. Although not explicitly shown in FIG. 7, other service details illustrated in FIG. 1 may be present as described in their exemplary form herein. In order to effectively utilize the data elements stored in the profile database 704, administrative and reporting interfaces are provided. The administration manager service 702 is resident in the service mediator 700 and provides a standard Hyper-Text Transfer Protocol/Hyper-Text Markup Language (HTTP/HTML) formatted interface. The query manage device 701 is also resident within the service mediator 700 and provides for a set of standardized query transactions to be defined for processing the profile database 704.

System administrators may use a standard Web-based display device 705 to access and make updates and queries to the profile database 704. The mechanism to allow this would involve the web administrator 705 contacting and logging-on to the administrator manager service 702 over standard internet Web transport. The administrator service will process multiple levels of authentication and authorization such that multiple levels of access may be provided ranging from full create, delete and update access to read-only access limited to certain data sets. Once authenticated, the administrator 705 is presented a menu of options by the query manager 701. When a selection is made, the transaction is forwarded to the profile manager 703 for processing with the results returned via the query manager 701 and the administrator manager 702.

When the profile data is required to be processed within the context of an existing enterprise software system, such as a customer billing system, a programmatic interface is supplied. FIG. 7 displays an exemplary enterprise system 706 with associated administrative interfaces such as the user console 709, the report printing device 708 and a local data storage 707. To facilitate the direct program-to-program interface between this system and the service mediator 700 system, an intermediate software system is supplied in the form of transaction manager service 710. The transaction manager 710 is a service that translates the access method and transaction format such that these two systems may communicate. The transaction manager 710 may be thought of as a "protocol converter" between two dissimilar systems, enabling communications in a way that is natural for each of the end-point systems. The transaction manager 710 will conform to the native object interface for the enterprise system 706. Examples of this would be the transaction manager providing CORBA object interface such that it can exist natively in an enterprise CORBA system. The transaction manager 710 also has the responsibility of translating the data requests and record formats between the formats of the endpoint systems.

An exemplary use of this system would be the generation of a billing report. The initial request would be entered into the enterprise administration console 709. The enterprise billing system 706 would recognize that data elements required for the report reside both in the enterprise local storage 707 as well as within the profile database 704. The enterprise billing system 706 would also recognize the transaction manager 710 as a natural source or device that may supply data. As the report is processed, the enterprise system 706 forwards requests to the transaction manager 710. This request is translated and forwarded to the query manager 701 and on to the profile manager 703 for final processing. The returned data transaction takes the reverse path back to the transaction manager 710 where the data is translated into the required format and forwarded to the enterprise billing system 706. The resulting report consisting of all processed data is output to the billing system printer 708 and/or the billing system local storage 707.

In order to be able to respond to the changing requirements of the distributed services network, "plug-in" component technology is used in both agent and server components. The plug-ins that are loaded into the agent represent the agent portion of a distributed services network. Each service is responsible for "exporting" its own agent plug-in and "publishing" version details with the agent plug-in library service. The plug-in approach allows the implementation architecture—i.e. which services run in which process on which machines—to be determined at runtime and even to be changed without interruption of service. One benefit of the runtime configuration feature is that it allows the service implementation to change in a way that tracks dynamic factors such as subsystem load changes. In this way, it is possible to roll out a new service without serious risk of adversely affecting existing services. If there is an impact on existing services, the on-line reconfiguration feature allows the services to adapt to the new environment. Such adaptation, in turn, is enabled through revisions to plug-ins.

The agent plug-in management (APM) service 95 shown in FIG. 1 is used to keep individual plug-in modules in agent instances current. As described herein, some updating of agent plug-ins will take place automatically, some will take place upon subscriber request, and some on administrative request. For example, an agent shipped or delivered to a new subscriber may contain only generic or minimal features, including the ability to contact the distributed service network and obtain the latest version of the standard agent features.

In the distributed service network, the agent features fall into the general categories of standard or optional. Standard features are required for participation in the distributed services network and are always automatically updated. Optional features may be supplied by a service provider or may be subscriber selectable. The subscriber can select to load the feature, or an update of it, either automatically as the version changes or on request. Whatever features are loaded onto the agent, the agent stores version data about for the plug-ins that it has loaded. This data is also stored in the subscriber profile database 99, making it possible for the subscriber to restore a lost disk or install a new machine without loosing a loaded plug-in. On the next re-connect to the distributed services network after the hardware change, the subscriber need only supply the agent-ID in order to restore the previous state.

Figure 8:
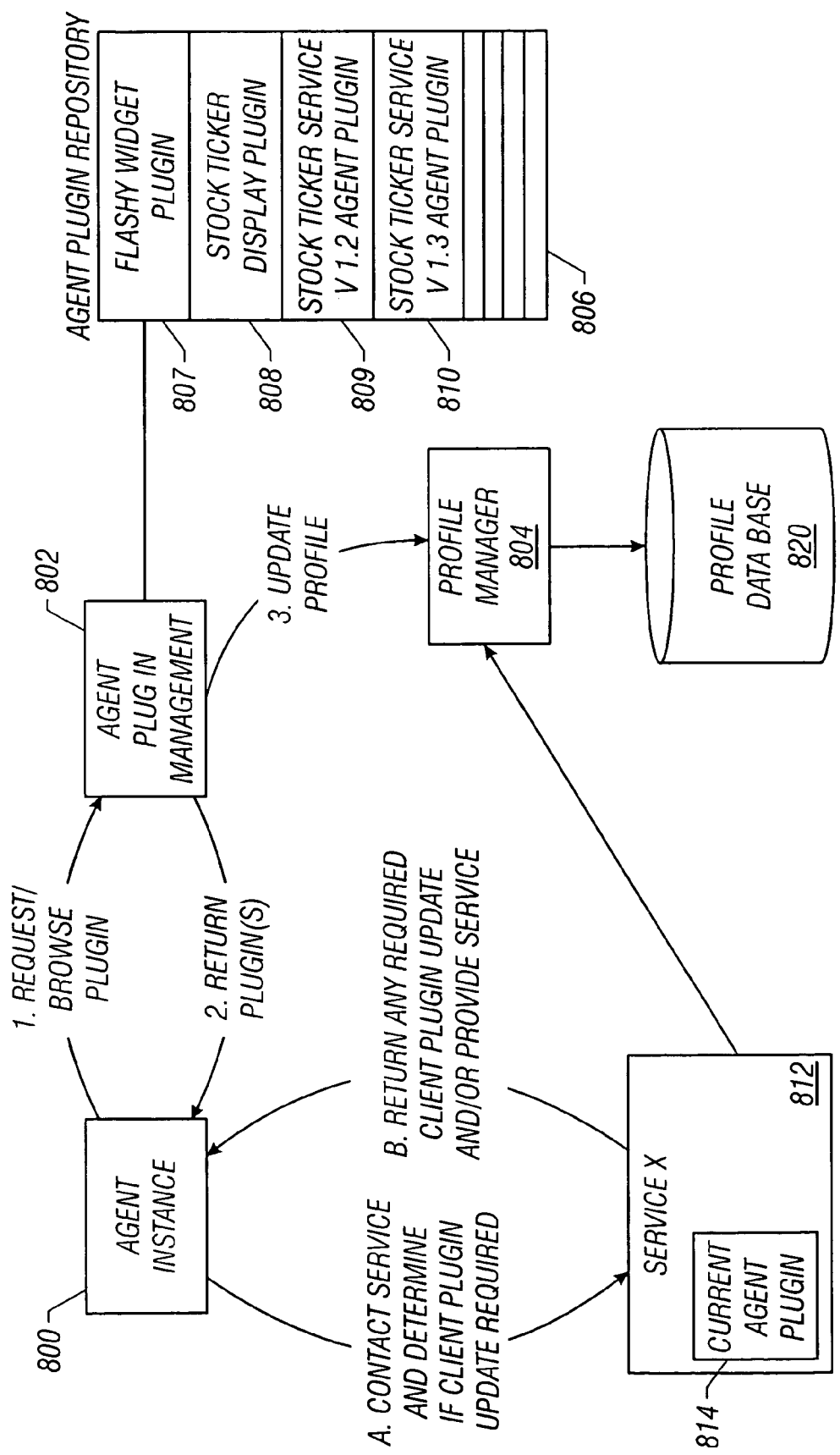
FIG. 8 shows a program version tracking aspect of an exemplary embodiment of the present invention.

FIG. 8 shows a version tracking aspect of an exemplary embodiment of the present invention wherein all plug-ins used in the distributed services network are stored in the agent plug-in repository (APR) service 806. This is a simple database that is optimized for read operations, as the data is fairly static in nature. The plug-ins 807, 808, 809, 810 may be indexed by name and version. The APR 806 also supports a browsing feature that presents the available plug-ins in a directory style hierarchical structure. Multiple references to a single plug-in are permitted in this directory structure, so the plug-ins can be located in a task specific fashion. When an agent requires or requests a new plug-in, the request is submitted to the agent plug-in management (APM) service 802 which retrieves the plug-in from the APR 806 and returns it to the agent instance 800. The APM service 802 then instructs the profile manager 804 (see also, FIG. 1, 91) to update the subscriber profile database 820 (see also FIG. 1, 99) to indicate which plug-in was loaded to the agent.

Where plug-ins that provide connections to services are managed by the services themselves, the service 812 keeps a copy of the agent plug-in versions 814 that it supports. When an agent 800 first contacts the service 812, a query protocol determines whether the agent 800 needs to update its plug-in for that service. If so, the service 812 provides the plug-in 814 to the agent 800 directly, and the agent performs the update immediately. The subscriber profile is updated by the service 812 instructing the profile manager 804 of the plug-in update operation. Since this method of updating an agent plug-in is predicated on the ability of that agent to contact a service, and since that ability is provided by the agent plug-in associated with that service, there is a "first-load" process. When the agent instance becomes aware that it needs a plug-in for a service, it loads the latest version that is available in the APR 806.

As referenced above, the subscriber profile management service 91 stores a list of all the plug-ins that have been loaded by each agent instance. This may be used by the APM service 802 to execute scripted update logic in order to determine agent update schedules. The plug-in listing may also be used to reload an agent instance with its previous state in the event that the agent machine has lost its locally stored state. The entry for a given agent may also store data about availability of new plug-ins and updated plug-ins.

Figure 9:
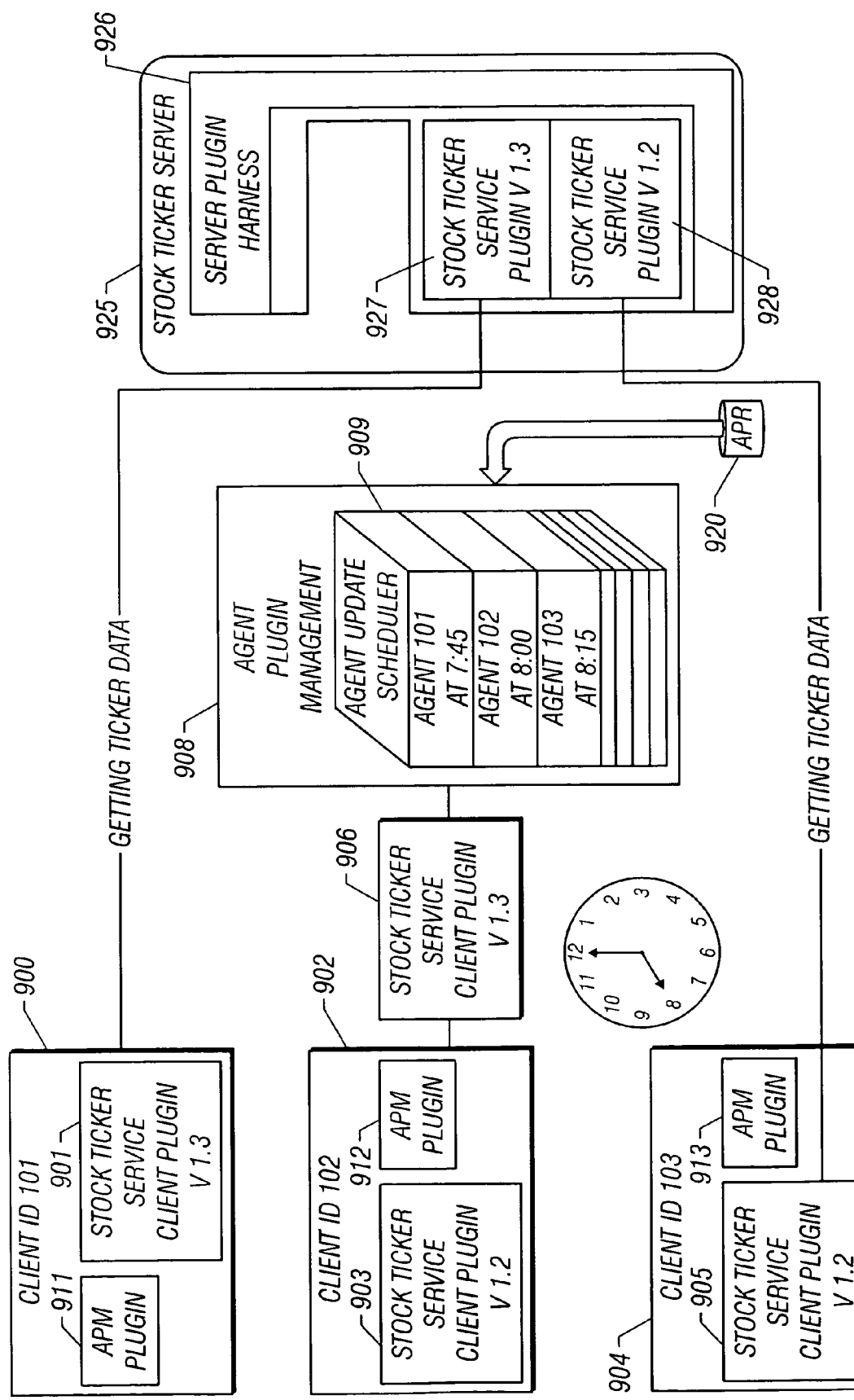
FIG. 9 shows an automated update aspect of an exemplary embodiment of the present invention.

FIG. 9 shows an automated update aspect of an exemplary embodiment of the present invention. In this embodiment, the APM service 908 provides administrative access to the APR 920 for the installation of new plug-ins, and to the subscriber profile data (not shown) regarding plug-ins for planning and execution of updates. The agent instances 900, 902, 904 contain an APM agent plug-in 911, 912, 913, which is able to accept update alerts from the APM 908. As shown in FIG. 9, a scripted scheduling mechanism allows the administrative user to schedule updates to occur by user, based on a specified period of time or other qualification. In the illustration of FIG. 9 which shows the status of agents 900, 902 and 904 at 8:00, agent 900 has already been updated with version 1.3 of the plug-in 901 under control of the scheduler 909, agent 902 is currently having its plug-in 903 updated or replaced with version 906, and agent 904 has not yet had its plug-in 905 updated by the scheduler 909.

Each agent in the distributed services network may also include the ability to display messages in short message class, and the services support the ability to send these messages. An interface allows an administrative user to create a message of limited length to all currently connected subscribers. The transmission will take place within a period of time that varies depending on the number of connected subscribers.

As shown in FIG. 1, the short message posting (SMP) service 96 accepts messages for delivery to agents. These messages are limited in scope, in format and in function. The format of the message is limited to simple text messages with an associated administrative message for use by the agent program. The message function is limited to a one way operation so that no agent replies are allowed, and to actions defined by the administrative message class.

The administrative message class instructs the agent process to display a dialog box with a predefined set of choices. For example, a message can be sent to ask the user if the agent program should shut down. The set of administrative messages is modifiable and extensible at run time. When new administrative message classes are defined, a new agent plugin for the associated dialog box must be provided as well.

The short message posting service 96 may be implemented as a simple rules interpretation engine whereby rules are submitted in script form and result in a list of agent-IDs that represent message targets for a given message. Each agent-ID item is associated with a time value indicating the time at which the message should be sent. Messages are stored in a database and referenced by message identification number.

The SMP service 96 maintains a database of message target-time pairs for each posted message. The entries are ordered by increasing time delay so that a linear scan of a list will find the "next" target first. A separate scheduling list is maintained for the purpose of scheduling scans of the posted message lists. This scheduling list contains pairs of message ids and time values that serve as message triggers, where the time value represents the next time at which the message is to be delivered to an agent.

In addition to exact time values, priority encoding time values are supported and may be used in the scheduling list. A simple priority number scheme may be used where a higher number indicates a higher priority. For message triggers with this time value type, the messages are sent as soon as all higher priority messages have been sent. A separate list of priority encoded message triggers is maintained for each message id so that their scanning will be orthogonal to exact time value encoding. Message IDs can have both priority and exact time triggers.

A configuration option for the SMP service controls the priority boundary. This boundary determines the priority relationship between priority valued message triggers and those with exact time values. If the time specified for an exact time valued message trigger has arrived, and there is a message with a priority encoded message trigger pending, this value is used to determine which is sent first. If the priority trigger's priority value is greater than the priority boundary, then it is sent in preference to the exact timed message. If it is lower than the priority boundary, then the exact timed message is preferentially sent.

The SMP service 96 may also maintain separate thread pools for sending messages and for processing rules. This means that urgent messages can be scheduled no matter how busy the service is with existing message traffic.

In accordance with the present invention, services can cause the agents to bring their state into compliance with the services' needs. This includes coordination of such factors as the versions of the service interface, form of the distribution architecture, algorithms for load balancing, failover mechanisms to identify alternate service locations in the event a primary service location fails, etc. It is a flexible but efficient way for the agent to be informed as to when it is necessary for it to modify any detail of its interaction with any given service, and how to accomplish the change.

While the system and method of the present invention has been described in connection with the preferred embodiment, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

We claim:

1. A method for managing a plurality of services located on a plurality of servers as an extensible service bus, comprising:
   providing a registration service where an agent machine can register as a subscriber with the extensible service bus and receive a subscriber identification;
   providing a login service where the agent machine can connect to the extensible service bus using the subscriber identification;
   providing a service map management service that receives server location information from each of the plurality of services;
   generating a service location map comprising a listing of the plurality of the services included on the extensible service bus and server location information corresponding to each service of the listing;
   providing a connection status service to monitor the connection status of subscribers and the servers connected to the extensible service bus; and
   providing a network control service, wherein the network control service causes a setting on a network device to change to establish a network physical connection to the agent machine, and the network physical connection complies with a requirement for the agent machine to use one of the plurality of services;
   transmitting a copy of the service location map to each subscriber to the extensible service bus.

2. The method for managing services of claim 1, further comprising:
   providing a subscriber profile database service that stores subscriber data that is required for access to the extensible service bus.

3. The method for managing services of claim 1, further comprising:
   transmitting a copy of the service location map to each subscriber to the extensible service bus.

4. The method for managing services of claim 1, wherein the providing the service location map comprises:
   selecting at least one service of the listing based on server load balancing techniques.

5. The method for managing services of claim 1, further comprising:
   providing a message posting service for sending messages directly to the subscriber when the subscriber is connected to the extensible service bus.

6. The method for managing services of claim 1, wherein the network control service enables the agent machine to communicate via a broadband network.

7. A computer program storage comprising:

first instructions for providing a registration service where an agent machine can register as a subscriber with the extensible service bus and receive a subscriber identification;

second instructions for providing a login service where the agent machine can connect to the extensible service bus using the subscriber identification;

third instructions for providing a service map management service that receives server location information from each of the plurality of services;

instructions for generating a service location map comprising a listing of at least one of the plurality of the services included on the extensible service bus and server location information corresponding to each service of the listing;

fourth instructions for providing a connection status service to monitor the connection status of subscribers and the servers connected to the extensible service bus; and fifth instructions for providing a network control service, wherein the network control service causes a setting on a network device to change to establish a network physical connection to the agent machine, and the network physical connection complies with a requirement for the agent machine to use one of the plurality of services;

sixth instructions for transmitting a copy of the service location map to each subscriber to the extensible service bus.

8. A system comprising:

a registration service where an agent machine can register as a subscriber with the extensible service bus and receive a subscriber identification;

a login service where the agent machine can connect to the extensible service bus using the subscriber identification;

a service map management service that receives server location information from each of the plurality of services and which generates a service location map in response to receiving server location information, wherein the service location map comprises a listing of at least one of the plurality of the services included on the extensible service bus and server location information corresponding to each service of the listing;

a connection status service to monitor the connection status of subscribers and the servers connected to the extensible service bus; and a network control service, wherein the network control service causes a setting on a network device to change to establish a network physical connection to the agent machine, and the network physical connection complies with a requirement for the agent machine to use one of the plurality of services;

a circuit for transmitting a copy of the service location may to each subscriber to the extensible service bus.

9. A server computer system comprising:

a processor for executing instructions; and a memory for storing the instructions, wherein the instructions comprise:

first instructions for providing a registration service where an agent machine can register as a subscriber with the extensible service bus and receive a subscriber identification;

second instructions for providing a login service where the agent machine can connect to the extensible service bus using the subscriber identification;

third instructions for providing a service map management service that receives server location information from each of the plurality of services;

instructions for generating a service location map comprising a listing of at least one of the plurality of the services included on the extensible service bus and server location information corresponding to each service of the listing;

fourth instructions for providing a connection status service to monitor the connection status of subscribers and the servers connected to the extensible service bus; and fifth instructions for providing a network control service, wherein the network control service causes a setting on a network device to change to establish a network physical connection to the agent machine, and the network physical connection complies with a requirement for the agent machine to use one of the plurality of services;

sixth instructions for transmitting a copy of the service location map to each subscriber to the extensible service bus.

10. The method of claim 1 wherein the network device is not one of the plurality of servers.

11. The computer program product of claim 7 wherein the network device is not one of the plurality of servers.

12. The system of claim 8 wherein the network device is not one of the plurality of servers.

13. The server computer system of claim 9 wherein the network device is not one of the plurality of servers.

14. The method of claim 1 wherein the setting is a desired line speed.

15. The computer program product of claim 7 wherein the setting is a desired line speed.

16. The system of claim 8 wherein the setting is a desired line speed.

17. The server computer system of claim 9 wherein the setting is a desired line speed.

* * * * *